United States Patent [19]

Ando

[11] Patent Number: 4,471,918
[45] Date of Patent: Sep. 18, 1984

[54] WEBBING STRETCHING DEVICE

[75] Inventor: Takayuki Ando, Okazaki, Japan

[73] Assignee: Kabushiki Kaisha Tokai-Rika-Denki Seisakusho, Aichi, Japan

[21] Appl. No.: 432,013

[22] Filed: Sep. 30, 1982

[30] Foreign Application Priority Data

Oct. 29, 1981 [JP] Japan .......................... 56-161351[U]

[51] Int. Cl.³ ....................... A62B 35/02; B65H 75/48
[52] U.S. Cl. ...................................... 242/107; 280/806
[58] Field of Search .................. 242/107.4 R–107.4 E, 242/107; 280/806; 297/480; 244/122 B

[56] References Cited

U.S. PATENT DOCUMENTS

| 4,014,479 | 3/1977 | Nilsson et al. | 242/107.4 R |
| 4,056,242 | 11/1977 | Herrmann | 242/107.4 R |
| 4,187,925 | 2/1980 | Lindblad | 242/107.4 R X |
| 4,191,344 | 3/1980 | Tillac | 242/107 |

FOREIGN PATENT DOCUMENTS

| 1913448 | 8/1980 | Fed. Rep. of Germany | 242/107.4 A |
| 2491340 | 4/1982 | France | 242/107.4 R |

Primary Examiner—John M. Jillions
Attorney, Agent, or Firm—Koda and Androlia

[57] ABSTRACT

A small spiral spring and a large spiral spring are provided coaxially with a webbing takeup shaft. During normal running condition of a vehicle, a trigger means prevents rotation of a working ring subjected to a biasing force of the large spiral spring, the working ring is separated from the takeup shaft by a clutch means, and a weak biasing force of the small spiral spring acts on the takeup shaft.

In an emergency situation of the vehicle, the trigger means permits the working ring to rotate and the clutch means connects the working ring to the takeup shaft, whereby the biasing force of the large spiral spring is imparted to the takeup shaft, so that a tensile force can be rendered to the webbing.

11 Claims, 10 Drawing Figures

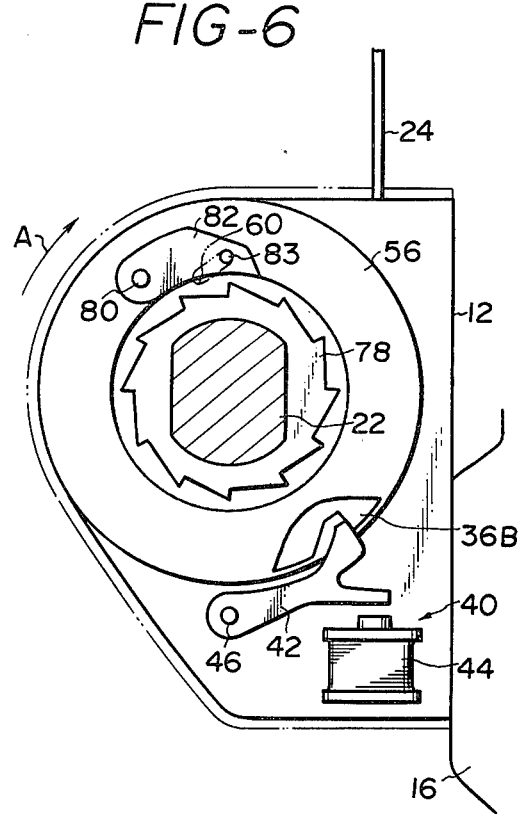

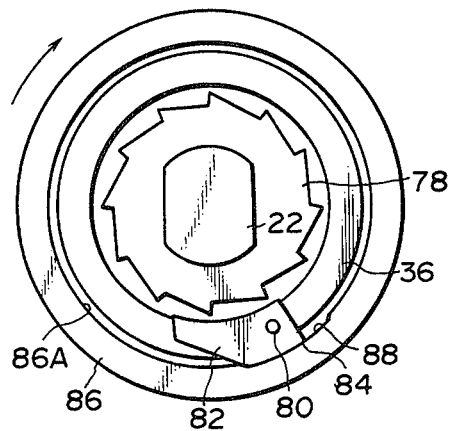
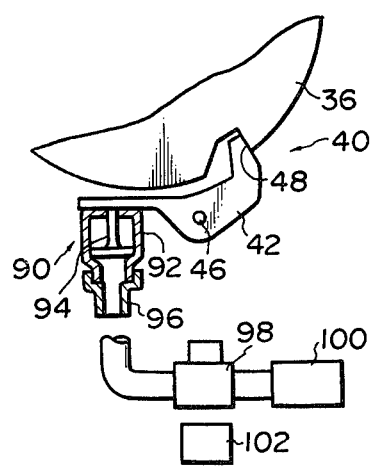
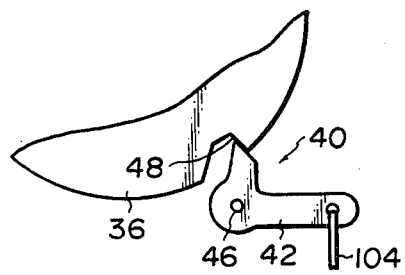
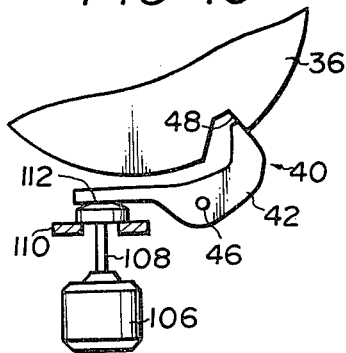

WEBBING STRETCHING DEVICE

BACKGROUND OF THE INVENTION

1. Field of the Invention

This invention relates to a webbing stretching device for rendering a tensile force to an occupant restraining webbing to tightly fasten the same about an occupant in an emergency situation of a vehicle.

2. Description of the Prior Art

In a seatbelt system for protecting an occupant in an emergency situation of a vehicle, a webbing whose one end is retracted into a retractor is fastened about the occupant and the webbing restrains the occupant in an emergency situation of the vehicle.

The retractor for retracting this webbing renders a tension of a predetermined value to the webbing. However, in order not to give an excessive oppressive feeling to the occupant, a winding force is made to be relatively weak, being formed a slight gap between the webbing and the occupant. In consequence, such a disadvantage has been presented that after the webbing unwinding from the retractor has been stopped in an emergency situation of the vehicle, the occupant is moved by a value of the gap in a direction of a collision before he is reliably restrained by the webbing.

From this reason, heretofore, there has been proposed a webbing stretching device in which the intermediate portion of the webbing is moved perpendicularly to the longitudinal direction of the webbing to render a tensile force to the webbing or a takeup shaft of the retractor is rotated by a specially provided drive means to give a tensile force to the webbing. However, these stretching devices are all large-sized and complicated in construction, thereby necessitating change the conventional retractors in construction to a considerable extent.

SUMMARY OF THE INVENTION

The present invention has been developed to obviate the above-described disadvantages of the prior art and has as its object the provision of a webbing stretching device capable of being integrally assembled into a webbing retractor, and yet, applicable to the conventional retractor without needing to change the conventional retractor in construction to considerable extent.

In the webbing stretching device according to the present invention, there are provided a small spiral spring for rendering a weak biasing force to the webbing and a large spiral spring for giving a strong biasing force to the webbing. During normal running condition of the vehicle, rotation of a working ring for causing the biasing force of the large spiral spring to act is prevented by a trigger means, whereby only the biasing force of the small spiral spring acts on the takeup shaft. Whereas, in an emergency situation of the vehicle, the trigger means permits the working ring to rotate and a clutch means connects the working ring to the takeup shaft, whereby the biasing force of the large spiral spring is caused to act on the webbing.

Description will hereunder be given of embodiments of the present invention with reference to the drawings.

BRIEF DESCRIPTION OF THE DRAWINGS

FIG. 6 is a sectional view taken along the line VI—VI in FIG. 5;

FIG. 7 is a front view of the essential portions showing the clutch means in a fourth embodiment of the present invention; and FIGS. 8 through 10 are front views of the essential portions showing a fifth through seventh embodiments of the present invention.

DESCRIPTION OF THE PREFERRED EMBODIMENTS

Figure 1:
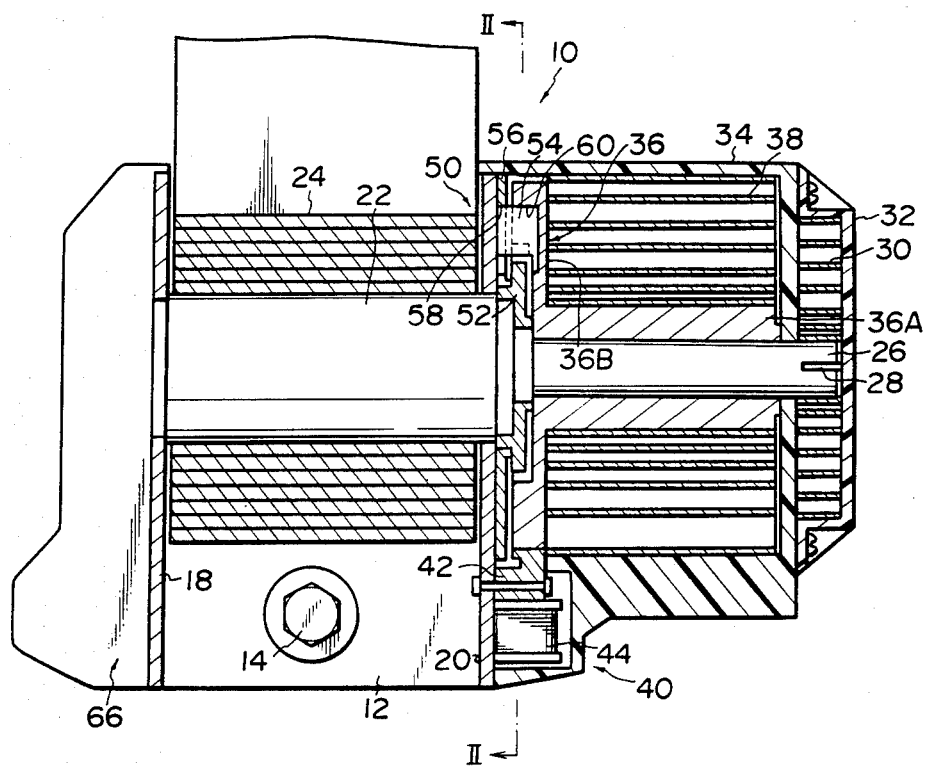
FIG. 1 is a sectional view showing a first embodiment of the webbing stretching device according to the present invention.

FIG. 1 shows a construction in which the webbing stretching device according to the present invention is integrally assembled into a webbing retractor 10.

The webbing retractor 10 is solidly secured at its frame 12 to a vehicle body 16 by a bolt 14. A pair of leg plates 18 and 20 are extended from opposite side portions of this frame 12 in parallel to each other, and the intermediate portion of a takeup shaft 22 is journalled across the leg plates 18 and 20. Engaged with the intermediate portion of this takeup shaft 22 is one end of an occupant restraining webbing 24, and secured to the other end of the webbing 24 is a tongue plate, not shown. This tongue plate is engaged with a buckle device, not shown, whereby the intermediate portion of the webbing 24 can be fastened about an occupant. The above-described arrangement is similar to that of the conventional webbing retractor.

Coaxially extended from the takeup shaft 22 projecting from the leg plate 18 is a small diameter portion 26, and engaged with a slit 28 notched at the forward end portion of this small diameter portion 26 is an inner end of a small spiral spring 30. This small spiral spring 30 is received in a small spring case 32 and engaged at its outer end with this small spring case. The small spring case 32 is solidly secured to the leg plate 20 through a large spring case 34. With the above-described arrangement, the small spiral spring 30 weakly biases the takeup shaft 22 in a webbing winding direction (direction indicated by an arrow A in FIG. 2), and functions to bring the webbing 24 into weak contact with the occupant when the webbing 24 is fastened about the occupant.

A cylindrical portion 36A of a working ring 36 is loosely coupled onto the outer periphery of the small diameter portion 26 and rotatable relative to the takeup shaft 22. Engaged with this cylindrical portion 36A is an inner end of the large spiral spring 38 and an outer end of this large spiral spring 38 is engaged with the inner periphery of the large spring case 34.

This large spiral spring 38 renders to the working ring 36 a biasing force larger in value than that of the small spiral spring 32. However, during normal running condition of the vehicle, the working ring 36 is prevented from rotating in the webbing winding direction by a trigger means 40, and, only in an emergency situation of the vehicle is the working ring 36 permitted to rotate in the webbing winding direction.

Figure 2:
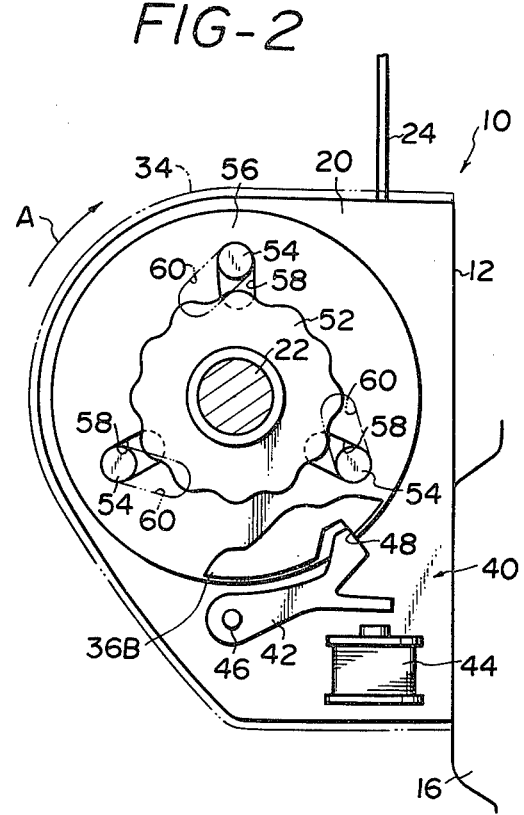
FIG. 2 is a sectional view taken along the line II—II in FIG. 1.

As shown in FIG. 2, the trigger means 40 has a pawl 42 and a solenoid 44. The pawl 42 is journalled on the leg plate 20 through a pin 46 and engaged with a notch 48 formed on the outer periphery of a disk portion 36B of the working ring 36 so as to prevent the working ring 36 from rotating in the webbing winding direction. In response to an exciting force from the solenoid 44 solidly secured to the leg plate 20, the pawl 42 rotates about the pin 46 to be released from the notch 48, so that the working ring 36 can rotate in the webbing winding direction. This solenoid 44 has such a connection that, in an emergency situation of the vehicle, the solenoid is energized by an acceleration sensor and the like.

A clutch means 50 is interposed between the working ring 36 and the takeup shaft 22, and separates the working ring 36 from the takeup shaft 22 during normal running condition of the vehicle, while, only in an emergency situation of the vehicle, the clutch means 50 imparts rotation of the working ring 36 to the takeup shaft 22. This clutch means 50 is constituted such that a gear wheel 52 formed at the outer periphery thereof with a plurality of projections is provided around the takeup shaft 22 and a plurality of pins 54 are spaced apart from and opposed to the outer periphery of this gear wheel 52, to thereby function as engageable members.

These pins 54 are columnar in shape, the axes thereof are in parallel to the takeup shaft 22 and held by a holder 56 secured to the outer surface of the leg plate 20. More specifically, this holder 56 is held between the gear wheel 52 and the leg plate 20, and prevented from rotating about the takeup shaft due to a frictional force between the leg plate 20 and itself. As shown in FIG. 2, this holder 56 is penetratingly provided with three slots 58 being elongate in the radial direction these pins are pressingly provided in the outer-most portions, i.e., end portions, which are opposite to the gear wheel 52, of these slots 58 respectively. In consequence, upon being subjected to a force of a high value in a direction of approaching the gear wheel 52, these pins 54 move in the slots 58, engage the gear wheel 52, connect the working ring 36 to the takeup shaft 22, to thereby impart a turning force of the working ring 36 to the takeup shaft 22.

On the other hand, the disk portion 36B of the working ring 36 is penetratingly provided with three slots 60, as indicated by two-dot chain lines in FIG. 2, which are opposed to the pins 54. The longitudinal axial lines of these slots 60 are inclined at about 45° from the longitudinal axial lines of the slots 58, respectively, and the pins 54 are coupled into the outer-most portions, i.e., end portions, which are opposed to the gear wheel 52, of these slots 60, respectively. These slots 60 have such functions of cams that, when the working ring 36 is rotated by the biasing force of the large spiral spring 38, the slots 60 cause the pins 54 to approach the gear wheel 52 along the slots 58.

In addition, when the pins 54 are abutted against tooth tops of the gear wheel 52 during rotation of the working ring 36, the holder 56 is subjected to a turning force of a high value about the takeup shaft and slightly rotated about the takeup shaft to cause the pins 54 to enter adjacent tooth bottoms, thus enabling to secure reliable engagement between the working ring 36 and the gear wheel 52. This holder 56 rotates in unison with the working ring 36 after the pins 54 have been reliably engaged with the tooth bottoms of the gear wheel 52.

Provided between leg plate 18 and an end portion of the takeup shaft 22 projecting from the leg plate 18 is an inertia lock mechanism 66, detailed construction of which is not shown, for preventing the takeup shaft 22 from rotating in the webbing unwinding direction in an emergency situation of the vehicle.

Description will now be given of action of the present embodiment with the above-described arrangement. The occupant can withdraw the webbing 24 from the takeup shaft 22 to fasten it about himself, and the webbing is brought into light contact with the occupant because the biasing force of the small spiral spring 30 acts on the webbing 24. During normal running condition of the vehicle, the occupant can desirably change his driving position because the inertia lock mechanism 66 is not in operation then.

If the vehicle is in an emergency situation such as a collision, then the solenoid 44 is energized due to an actuation of an acceleration sensor, not shown. By this, the pawl 42 is attracted by an exciting force of the solenoid and is released from the notch 48.

In consequence, the working ring 36 is rotated in the webbing winding direction by the biasing force of the large spiral spring 38. Subjected to forces from the inner peripheral surfaces of the slots 60 due to this rotation of the working ring 36, the pins 54 move in the slots 58 from the outer-most portions thereof towards the axis of the takeup shaft 22, approach the gear wheel 52 and are clamped between the gear wheel 52 and the working ring 36. Thereupon, the working ring 36 is connected to the takeup shaft 22 through the gear wheel 52, whereby the takeup shaft 22 is rotated in the webbing winding direction under the biasing force of the high value of the large spiral spring 38, thereby enabling to render a stretching force to the webbing. The webbing 24 removes the gap between the occupant and itself due to this stretching force.

On the other hand, simultaneously with the above, the inertia lock mechanism 66 instantaneously stops the webbing withdrawing rotation of the takeup shaft 22, so that the occupant can be tightly restrained by the webbing 24 and secured in safety.

Figure 3:
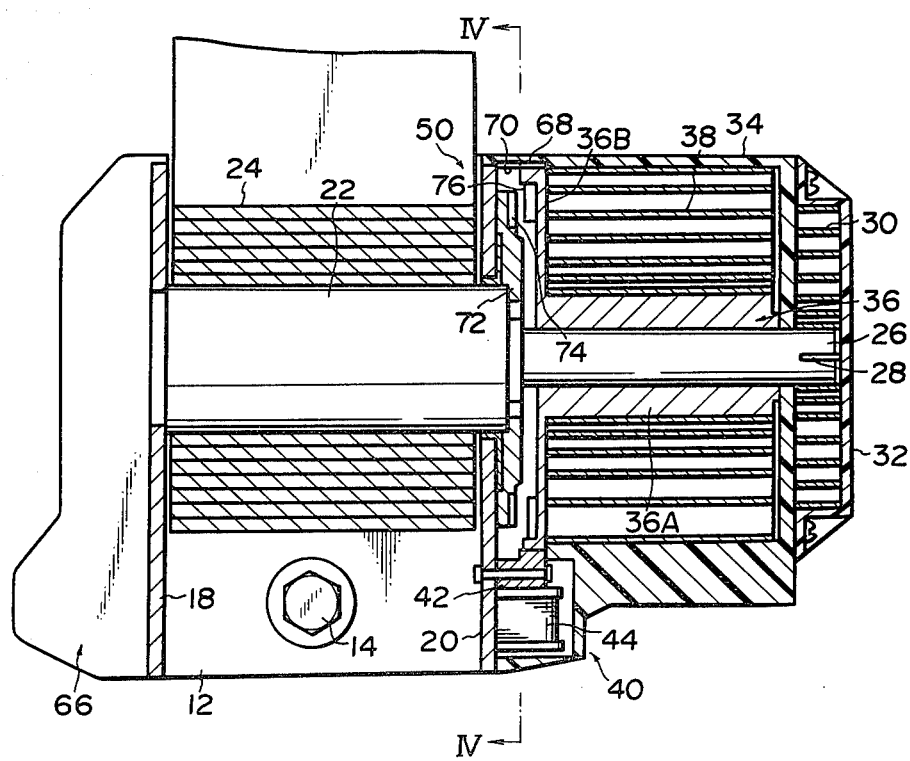
FIG. 3 is a sectional view showing a second embodiment of the present invention.
Figure 4:
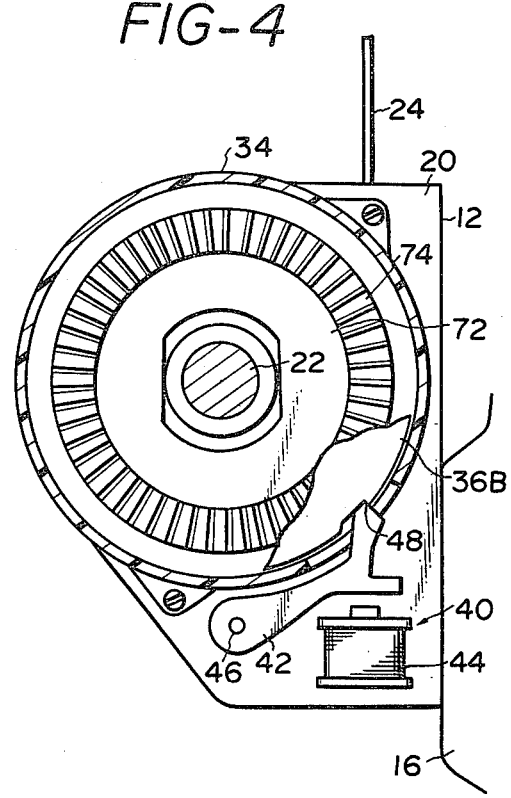
FIG. 4 is a sectional view taken along the line IV—IV in FIG. 3.

FIGS. 3 and 4 show the second embodiment of the present invention, which is another embodiment of the clutch means.

In the present embodiment, the working ring 36 is made movable in the axial direction of the small diameter portion 26 of the takeup shaft 22 by a certain value, and an externally threaded portion 68 is formed on the outer peripheral portion of the working ring 36 and engaged with an internally threaded portion 70 formed on the inner periphery of the large spiral spring case 34. In consequence, when rotated about the axis of the small diameter portion 26, this working ring 36 moves in the axial direction of the small diameter portion 26 and approaches the leg plate 20 due to the engagement of the externally threaded portion 68 with the internally threaded portion 70.

Furthermore, face gears 74 and 76 are formed on opposing surfaces of the disk portion 36B of the working ring 36 and a disk 72 solidly secured to the takeup shaft 22. During normal running condition of the vehicle, these face gears 74 and 76 are separated from each other. Whereas, when the working ring 36 moves in the axial direction of the takeup shaft 22 in an emergency situation of the vehicle, these face gears 74 and 76 are engaged with each other, whereby the working ring 36 is connected to the takeup shaft 22.

In consequence, in the present embodiment, when the trigger means 40 is actuated in an emergency situation of the vehicle, the working ring 36 rotates about the small diameter portion 26, moves in the axial direction thereof and engages the disk 72, whereby the retracting, biasing force of the large spiral spring 38 is imparted to the takeup shaft 22, so that the stretching force can be rendered to the webbing 24. The present embodiment is constructed such that the components thereof are somewhat complicated, however, the parts are reduced in number, the operation thereof is reliable and the connecting force between the working ring and the takeup shaft is strong.

Figure 5:
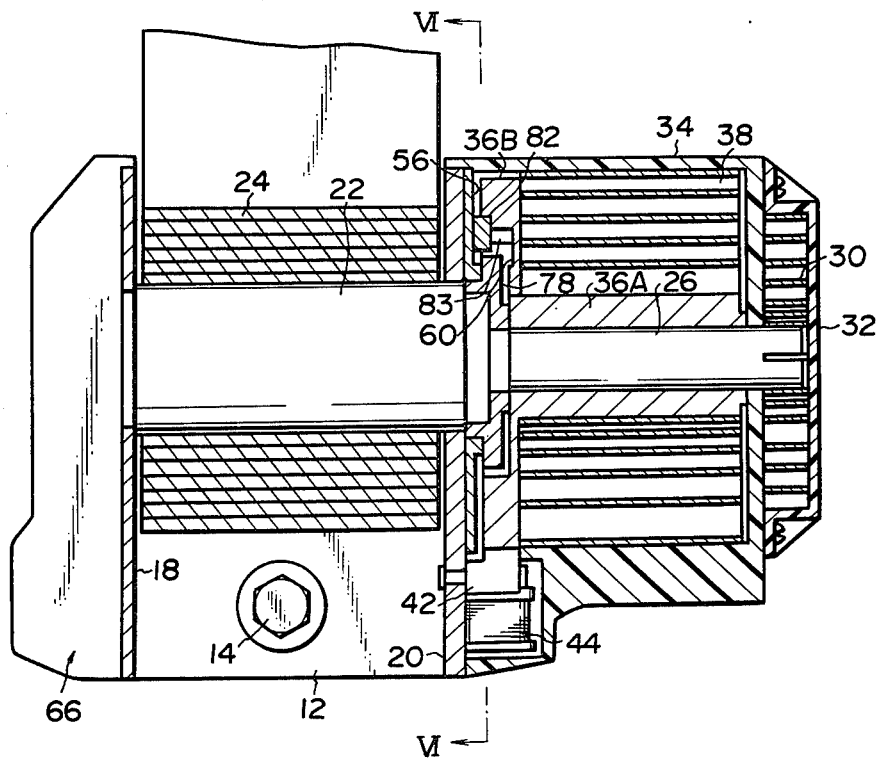
FIG. 5 is a sectional view showing a third embodiment of the present invention.

FIGS. 5 and 6 show the third embodiment of the present invention, which is a further embodiment of the clutch means.

A ratchet wheel 78 solidly secured to the takeup shaft 22 presses the holder 56 against the leg plate 20 in the same manner as in the first embodiment, whereby a frictional force is generated between the holder 56 and the leg plate 20. A pawl 82 as being an engageable member is journalled on this holder 56 through a pin 80 and opposed to the ratchet wheel 78. A pin 83 planted at the forward end portion of this pawl 82 is received in the slot 60 of the working ring 36.

This slot 60 functions as a cam in the same manner as in the first embodiment, receives the pin 83 at the outermost portion thereof during normal condition, whereby the pawl 82 is separated from the ratchet wheel 78. Whereas, during rotation of the working ring 36, the slot 60 causes the pawl 82 to approach the ratchet wheel 78, whereby the working ring 36 is connected to the takeup shaft 22.

Also in the present embodiment, the holder 56 is rotatable about the axis of the takeup shaft only when subjected to the turning force of a high value, so that the tooth top of the pawl 82 can be engaged with the tooth bottom of the ratchet wheel 78.

FIG. 7 shows the fourth embodiment of the present invention. This embodiment is a still further embodiment of the clutch means, in which the ratchet wheel 78 is solidly secured to the takeup shaft 22 in the same manner as in the third embodiment.

The pawl 82 as being the engageable member and opposed to the ratchet wheel 78 is journalled on the working ring 36 through the pin 80 and rotatable in unison with the working ring 36. During normal running condition of the vehicle, the pawl 82 is separated from the ratchet wheel 78 because a projection 84 formed on the rear surface thereof is received in a groove 88 of a holder 86 solidly secured to the frame of the takeup shaft 22, so that the takeup shaft 22 is freely rotatable without being subjected to the force of the large spiral spring 38.

When the trigger means is actuated to rotate the working ring 36 in the webbing winding direction in an emergency situation of the vehicle, the pawl 82, which has been withdrawn from the groove 88 of the holder 86, is pushed by the inner peripheral surface 86A of the holder 86 and the forward end portion thereof is engaged with a projection of the ratchet wheel 78, whereby the working ring is connected to the takeup shaft.

FIG. 8 shows the fifth embodiment of the present invention, which is another embodiment of the trigger means.

The pawl 42 engageable with the notch 48 of the working ring 36 has the other end portion opposed to an actuator 90. In this actuator 90, a piston 94 is received in a cylinder 92, and the piston 94 turns the pawl 42 about the pin 46 under liquid pressure fed from a liquid pressure pipe 96, whereby the pawl 42 is released from the notch 48.

The other end of the liquid pressure pipe 96 is communicated with a liquid pressure source 100 via a valve 98, and the valve 98 is actuated by an acceleration sensor 102.

In consequence, in the present embodiment, the acceleration sensor 102 opens the valve 98, whereby the liquid pressure from the liquid pressure source 100 is imparted to the actuator 90, whereby the piston 94 turns the pawl 42 to release it from the notch 48, so that the working ring can rotate in the webbing winding direction. In this embodiment, a change in the diameter of the cylinder 92 makes it possible to obtain a force of a desirable value, the response in operation is satisfactory and fluids other than liquids may be widely applicable.

FIG. 9 shows the sixth embodiment of the present invention, which is a further embodiment of the trigger means simplified in construction and excellent in response in operation. In the present embodiment, a wire 104 is connected to a portion of the pawl 42, and the other end of this wire 104 is connected to an acceleration sensor, a vehicle bumper or the like, not shown.

In consequence, in an emergency situation of the vehicle, the wire 104 is subjected to a tensile force due to an actuation of the acceleration sensor or deformation of the bumper by a collision, whereby the pawl 42 is released from the notch 48, so that the working ring 36 can be rotated.

FIG. 10 shows the seventh embodiment of the present invention, which is a still further embodiment of the trigger means. In the present embodiment, a pendulum 106 is opposed to the other end portion of the pawl 42. This pendulum 106 is suspended at a neck portion 108 thereof by a horizontal bracket 110 provided on the frame, and tilted in an emergency situation of the vehicle, whereby a top portion 112 of the pendulum 106 pushes the pawl 42 up to turn it about the pin 46, so that the pawl 42 can be released from the notch 48. From this reason, in this embodiment, construction is simplified, rendered compact in size, and all of the parts can be arranged in the webbing retractor.

According to the present invention, any clutch means and trigger means other than those described in the abovementioned embodiments can be all applicable only if they include the clutch means capable of reliably imparting rotation of the working ring to the takeup shaft in an emergency situation of the vehicle and the trigger means capable of permitting the working ring to rotate in the webbing winding direction in an emergency situation of the vehicle.

As has been described hereinabove, in the webbing stretching device according to the present invention, both the small spiral spring and the large spiral spring are disposed coaxially with the takeup shaft, and hence, the present invention can offer such an outstanding advantage that the stretching device can be secured to one side surface of the frame of the conventional retractor.

What is claimed is:

1. A webbing stretching device wherein a tensile force is rendered to an occupant restraining webbing to tightly fasten said webbing about an occupant in an emergency situation of a vehicle, comprising:
 (a) a takeup shaft engaging one end of said occupant restraining webbing;
 (b) a small spiral spring for rendering a weak biasing force to said takeup shaft to retract said webbing;

(c) a large spiral spring disposed coaxially with said small spiral spring, for rendering a biasing force larger in value than that of the small spiral spring to said takeup shaft;

(d) a working ring biased in a rotating direction by said large spiral spring, said working ring comprising a cylindrical portion loosely coupled onto said takeup shaft and an inner end of said large spiral spring is engaged with the outer periphery of said cylindrical portion;

(e) a trigger means for preventing said working ring from rotating in a webbing winding direction during normal running condition of the vehicle and for allowing said working ring to rotate in an emergency situation of the vehicle; and (f) a clutch means for connecting said working ring to said takeup shaft to render the biasing force of said large spiral spring to said webbing during rotation of said working ring in the webbing winding direction, whereby said webbing is retracted by the biasing force of said large spiral spring to tightly fasten said webbing about the occupant.

2. A webbing stretching device as set forth in claim 1, wherein said small spiral spring is engaged at an inner end thereof with the forward end portion of said takeup shaft and said large spiral spring is interposed between the forward end portion and a webbing takeup portion of said takeup shaft.

3. A webbing stretching device as set forth in claim 1, wherein, in said trigger means, a pawl is engaged with a notch formed on the outer periphery of said working ring, and, in an emergency situation of the vehicle, said pawl is released from said notch to allow the working ring to rotate.

4. A webbing stretching device as set forth in claim 3, wherein said pawl is released from said notch by an exciting force of a solenoid actuated in an emergency situation of the vehicle.

5. A webbing stretching device as set forth in claim 3, wherein said pawl is released from said notch by a push-up force of an accelerator sensor to be tilted in an emergency situation of the vehicle.

6. A webbing stretching device as set forth in claim 1, wherein, in said clutch means, an engageable member subjected to a turning force of said working ring is engaged with a projection rotating in unison with said takeup shaft, whereby said working ring is connected to said takeup shaft.

7. A webbing stretching device as set forth in claim 6, wherein said working ring is provided with a cam for causing said engageable member to approach said takeup shaft during rotation of said working ring.

8. A webbing stretching device as set forth in claim 7, further comprising a holder disposed coaxially with said takeup shaft, said holder guiding said engageable member in the radial direction of the takeup shaft until said engageable member is engaged with the projection rotating in unison with said takeup shaft, and rotating in unison with the takeup shaft after said engageable member has been engaged with said projection.

9. A webbing stretching device as set forth in claim 1, wherein, in said clutch means, said working ring moves in the axial direction thereof and is engaged with the takeup shaft during rotation of said working ring, whereby the biasing force of the large spiral spring is imparted to the takeup shaft.

10. A webbing stretching device as set forth in claim 1, wherein a holder is provided coaxially with said takeup shaft, said holder is provided with a pawl engageable with a projection rotating in unison with said takeup shaft during rotation of the working ring, said holder for guiding said pawl in the radial direction of the takeup shaft until said pawl is engaged with said projection and said holder rotates in unison with said takeup shaft after said pawl has been engaged with said projection.

11. A webbing stretching device used in a seatbelt system for protecting an occupant in an emergency situation of a vehicle, comprising:

a frame secured to a vehicle body;

a takeup shaft journalled on said frame and engaging one end of an occupant restraining webbing;

a small spiral spring interposed between one end of said takeup shaft and said frame, for rendering a weak biasing force to said takeup shaft to retract said webbing;

a large spiral spring provided coaxially with said small spiral spring, interposed between said small spiral spring and said frame, and engaged at an outer end thereof with said frame;

a working ring loosely coupled onto said takeup shaft, rotatable relative to said takeup shaft, and engaging an inner end of said large spiral spring, said working ring comprising a cylindrical portion loosely coupled onto said takeup shaft and an inner end of said large spiral spring is engaged with the outer periphery of said cylindrical portion;

a trigger means, in which a pawl is engaged with said working ring to prevent said working ring from rotating in the webbing winding direction during normal running condition of the vehicle, and said pawl is separated from said working ring to permit said working ring to rotate in the webbing winding direction in an emergency situation of the vehicle; and a clutch means, in which rotation of said working ring is imparted to said takeup shaft through an engageable means during rotation of said working ring in the webbing winding direction, whereby a tensile force is rendered to said webbing.

* * * * *